July 17, 1956  J. SHERWOOD ET AL  2,755,442
FREQUENCY DISCRIMINATOR
Filed Dec. 17, 1951

INVENTOR.
JOHN SHERWOOD
LLOYD WINTER
BY
ATTORNEY

United States Patent Office 2,755,442
Patented July 17, 1956

2,755,442

FREQUENCY DISCRIMINATOR

John Sherwood, Cedar Rapids, and Lloyd Winter, Marion, Iowa, assignors to Collins Radio Company, Cedar Rapids, Iowa, a corporation of Iowa Application December 17, 1951, Serial No. 262,082

3 Claims. (Cl. 324—82)

This invention relates in general to frequency meters and in particular to a frequency meter which has great accuracy.

It is oftentimes desirable in electronics to compare frequency and phase of an alternating current voltage or current with the resonant frequency of a tuned circuit or with the frequency and phase of a second voltage or current. It is particularily advantageous when comparing the phase of an incoming signal with a tuned circuit output to isolate the tuned circuit from the output circuit.

It is an object of this invention therefore to provide a frequency detector wherein the variations in an amplifier tube do not destroy the accuracy of the frequency meter.

Another object of this invention is to provide an improved frequency meter.

A particular object of this invention is to provide a discriminator which utilizes a parallel resonant circuit to produce a phase shift of an input signal in accordance with its frequency relative to the resonant frequency and to produce an output voltage proportional to the amount of phase shift, thus providing a measure of the input signal frequency.

Further objects, features, and advantages of this invention will become apparent from the following description and claims when read in view of the drawings, in which:

Figure 1 illustrates a terminal 10 which receives the incoming signal of an unknown frequency. This signal is supplied to a grid 11 of an amplifier tube $V_1$ through a resistor $R_1$.

Figure 1:
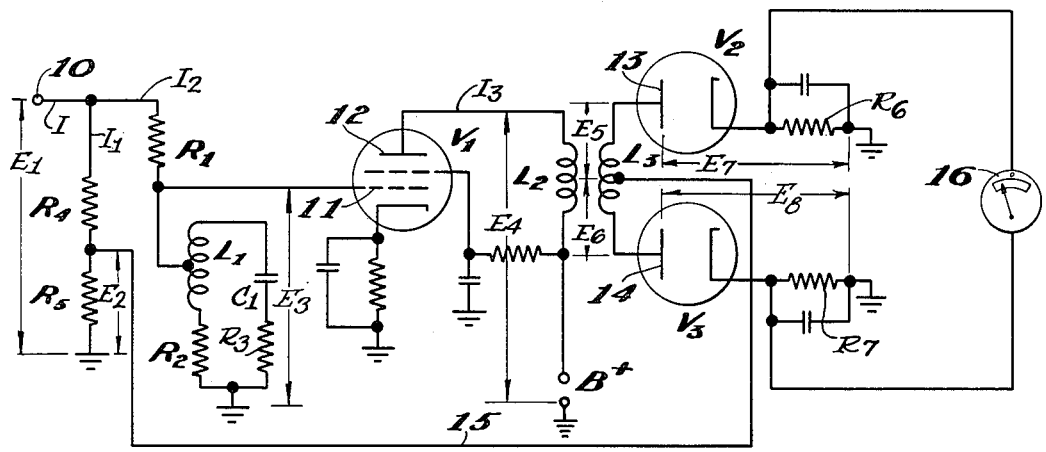
Figure 1 is a schematic view of the frequency meter of this invention.

A tuned circuit comprising inductance $L_1$, capacitance $C_1$ and resistors $R_2$ and $R_3$ has one end connected to ground. The inductance is tapped and supplies an input to the grid 11.

The tuned circuit and resistor $R_1$ comprise a phase shift circuit.

The plate 12 of the tube $V_1$ is connected to one terminal of an inductance $L_2$ which has its other terminal connected to B plus. $L_2$ forms the primary of a transformer which has a secondary $L_3$. Opposite ends of $L_3$ are connected to plates 13 and 14 respectively, of diodes $V_2$ and $V_3$.

A portion of the incoming signal supplied to terminal 10 is furnished to the midpoint of inductance $L_3$ by a lead 15.

Resistors $R_4$ and $R_5$ form a voltage divider so that only a portion of the signal is supplied to the secondary $L_3$.

An indicating meter 16 is connected between the cathodes of tubes $V_2$ and $V_3$ and may be of the type which has a zero center. When the incoming signal is below the resonant frequency of the tuned circuit it indicates to one side of the meter and when it is above the resonant frequency it indicates to the other side of the meter.

Advantages of this circuit are:

1. The resonant circuit (the element that determines the absolute limit of measuring accuracy) is of the two terminal type.

2. The input capacity of the amplifier tube is the only reactive element connected across the resonant circuit and it is usually tapped down.

3. The detectors $V_2$ and $V_3$ are not connected in any way to the resonant circuit.

4. No direct current flows through the resonant circuit. The sensitivity of the phase meter is high because the required 90 degrees phase shift is accomplished without the usual loss of voltage. This is true because the reactance of inductor $L_2$ is relatively small compared to the plate resistance of the tube $V_1$. This results in the substantially 90 degree phase shift across the inductance $L_2$ holding for a wide range. The range depends on the ratio of $R_p$ to $L_2$ (where $R_p$ is the plate resistance of the amplifier tube).

5. The diode circuit is symmetrical with respect to ground thus allowing the resistance and any stray reactances to be balanced over a broad frequency range.

6. Variations in the amplifier tube have little effect upon performance.

7. The signal source may have reasonably high impedance and does not require a direct current return path.

8. The resistors $R_4$ and $R_5$ may be used to improve the symmetry about the frequency or to increase the frequency range over which the output versus frequency or phase difference is linear.

Figures 2, 3:
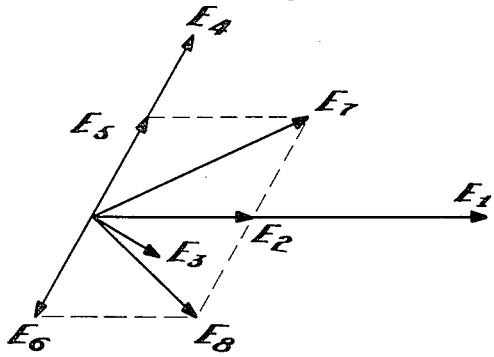
Figure 2 is a vector diagram of the voltage relationships when the two signals are in phase.
Figure 3 is a vector diagram illustrating the condition when the incoming signal is above the resonant frequency of the tuned circuit; and, Figure 4 illustrates the vector diagram when the incoming circuit is below the resonant frequency of the tuned circuit.

Figure 2 illustrates the vector relationships in the circuit when the signal applied to terminal 10 is in phase with the signal from the tuned circuit comprising $L_1$ and $C_1$. The voltage $E_1$ corresponds to the unknown voltage supplied to terminal 10. The voltage $E_2$ corresponds to the voltage across the resistor $R_5$. The voltage $E_3$ corresponds to the voltage from grid 11 to ground. Voltage $E_4$ corresponds to the voltage across the primary $L_2$. The voltages $E_7$ and $E_8$ represent the outputs from the plate 13 of diode $V_2$ and the center tap of the secondary $L_3$. Voltage $E_6$ corresponds to the voltage between the center tap of the secondary and the plate 14 of tube $V_3$. The voltages $E_7$ and $E_8$ represent the outputs from the diode rectifiers $V_2$ and $V_3$. It is to be noted that $E_7$ and $E_8$ have the same magnitude in Figure 2 which corresponds to the synchronized condition.

Figure 4:
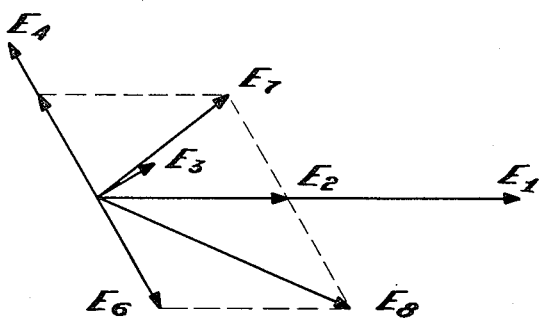

Figure 3 shows the vector relationships when the incoming signal is above the resonant frequency of the tuned circuit and Figure 4 illustrates the relationships when the incoming signal is below the resonant frequency of the tuned circuit.

The operation of the circuit will now be explained in further detail. The incoming signal current I will divide at point A and part $I_1$ will go through resistors $R_4$ and $R_5$, and part $I_2$ will go through resistor $R_1$ and the tank circuit. The voltage across resistor $R_5$, designated as $E_2$, will be equal to $I_1R_5$ and is fed to the center tap of secondary $L_3$ through lead 15. It will be noted that $E_2$ will always be in phase with $E_1$ as shown in Figures 2, 3 and 4.

The signal voltage $E_1$ will also appear across the resistor $R_1$ and the tank circuit in series. At resonance the tank circuit will appear as a large resistance and the voltage $E_3$ across it will be in phase with $E_1$ This may be noted in Figure 2 which vectorially shows conditions at resonance.

The tank voltage $E_3$ is the voltage applied to the control grid of tube $V_1$ and will cause a plate current $I_3$ to flow which will be 180 degrees out of phase with $E_3$ if the plate circuit is resistive. The plate circuit will be substantially resistive because the reactive component $$\omega L_2 - \frac{1}{\omega C_{pk}}$$

(where $C_{pk}$ is the plate to cathode capacitance of the tube $V_1$) is very small, compared to the plate resistance of the tube $V_1$, since tetrodes and pentodes have very high plate resistance.

The plate current $I_3$ in primary $L_2$ will induce a voltage in secondary $L_3$ ninety degrees lagging behind $I_3$ which results in a ninety degree phase relationship between $E_3$ and the induced voltage in $L_3$. The induced voltage in $L_3$ is however divided into two parts, $E_5$ and $E_6$, by the center tap and they are equal in magnitude and out of phase. $E_5$ will continue to lead $E_3$ by ninety degrees but $E_6$ will lag $E_3$ by ninety degrees. It is thus proven that $E_5$ and $E_6$ are in quadrature with $E_3$, and this will be the case regardless of signal frequency as long as the plate circuit of $V_1$ is substantially resistive which can always be maintained by adding other components in the plate circuit if necessary.

Two voltages are injected into the diode $V_2$ circuit, $E_2$ and $E_5$, which must be in quadrature at resonance because $E_3$ is then in phase with $E_2$, and therefore $E_2$ and $E_5$ have the resultant voltage $E_7$ shown in Figure 2.

The voltages injected into the diode $V_3$ circuit are $E_2$ and $E_6$ and they result in voltage $E_8$ in Figure 2 at resonance which is equal in magnitude to $E_7$. Voltages $E_7$ and $E_8$ are rectified by the respective diodes and the resulting direct current voltage outputs will be equal and opposite which will maintain the meter 16 at zero when the incoming signal frequency is the resonant frequency of the tank circuit.

If the signal frequency changes from resonance, the impedance of the tank circuit decreases and its phase angle changes as stated below. $E_3$ will then decrease in magnitude to cause its controlled quadrature voltages $E_5$ and $E_6$ to likewise decrease in magnitude.

When the signal frequency is higher than resonance, the tank circuit impedance will become capacitive and the voltage across it, $E_3$, will lag behind $E_1$ as indicated in Figure 3. The resultant voltages in the diode circuits, $E_7$ and $E_8$, are no longer equal in magnitude nor equal and opposite in phase, and their rectified voltages are no longer equal and the indicator in voltmeter 16 will swing to one side of zero.

When the signal frequency is lower than resonance, the tank circuit impedance will become inductive and the voltage across it, $E_3$, will become leading as indicated in Figure 4.

Although this invention has been described with respect to a particular embodiment thereof, it is not to be so limited as changes and modifications may be made therein which are within the full intended scope of the invention as defined by the appended claims.

We claim:

1. A frequency deviation circuit comprising, a potentiometer connected between an input terminal and ground, a first resistor with one end connected to said input terminal, a tank circuit connected to the other end of said first resistor and grounded at its other end, a tube with a control grid connected to the common point of said resistor and tank circuit, a transformer with a primary connected in the plate circuit of said tube and said plate circuit having much greater resistance than reactance, a series circuit including a pair of oppositely poled rectifiers connected between the terminals of the secondary of said transformer, a center tap of said secondary connected to a tap on said potentiometer, said series circuit including a second resistor connected between ground and one rectifier, a third resistor connected between ground and the other rectifier, and a first capacitor across the second resistor and a second capacitor across the third resistor to furnish a smooth output.

2. A discriminator comprising an input circuit including a two terminal parallel resonant circuit tuned to a reference frequency for producing a phase shift of an input voltage proportional to the frequency difference between the input voltage and said reference frequency, means for impressing an input voltage across said input circuit, an electron tube having plate, cathode and control electrodes, a first circuit including a common path between said cathode electrode and one terminal of said resonant circuit, the other terminal of said resonant circuit connected directly to said control electrode, a transformer having a primary winding and a center tapped secondary winding, a second circuit between said plate electrode and said cathode electrode including the primary winding of said transformer, the said second circuit being of high resistive impedance relative to the reactive impedance whereby the voltage induced in said secondary winding is in phase quadrature with the phase shifted input voltage, circuit means for applying a voltage proportional to said input voltage between said center tap and said common path, rectifying means connected across one terminal of said secondary winding and said common path, rectifying means connected across the other terminal of said secondary winding and said common path, and means for differentially combining the currents through said rectifying means for producing an output voltage proportional to the difference between the frequency of input voltage and said reference frequency.

3. A frequency deviation meter comprising a phase shift circuit including a two-terminal parallel resonant circuit, means for impressing an input signal across said phase shift circuit, an amplifier tube with its control grid connected to one terminal of the parallel resonant circuit, a transformer with its primary connected in the plate circuit of said amplifier tube, said plate circuit presenting a high resistance and low reactance path for the amplified signal, a pair of diode rectifiers, the secondary of said transformer having opposite terminals each connected to one of the plates of said diode rectifiers, circuit means including a ground connection between the cathode of said rectifiers, means for applying a second input signal proportional to said input signal between the mid-point of said secondary and said ground connection and an indicating meter connected between the cathodes of said diodes to indicate the frequency of the input signal relative to the resonant frequency of said resonant circuit.

References Cited in the file of this patent
UNITED STATES PATENTS

| | | |
|---|---|---|
| 2,196,590 | Koch | Apr. 9, 1942 |
| 2,333,990 | Dome | Nov. 9, 1943 |
| 2,340,432 | Schock | Feb. 1, 1944 |
| 2,502,456 | Hansen et al. | Apr. 4, 1950 |
| 2,535,666 | Broding | Dec. 26, 1950 |
| 2,585,532 | Briggs | Feb. 12, 1952 |
| 2,600,292 | Heath | June 10, 1952 |